United States Patent [19]
Booth

[11] Patent Number: 6,089,795
[45] Date of Patent: Jul. 18, 2000

[54] MOBILE APPARATUS FOR PNEUMATIC CONVEYANCE OF GRAVEL OR SIMILAR GRANULAR MATERIAL

[76] Inventor: Larry Booth, 10704½ 32nd St. East, Puyallup, Wash. 98372

[21] Appl. No.: 08/943,392

[22] Filed: Oct. 3, 1997

[51] Int. Cl.⁷ .................. B60P 1/60; B60P 9/00; B60P 3/00; B60R 7/00
[52] U.S. Cl. ................ 406/43; 406/61; 406/130; 406/144; 406/153; 406/168; 406/172; 406/173; 406/196; 414/462; 296/3; 224/405; 209/133
[58] Field of Search ............... 406/43, 39, 61, 406/56, 121, 130, 144, 153, 168, 171, 172, 173, 175, 191, 196; 414/462, 437, 522; 296/3, 4, 7, 8; 224/405; 55/421; 95/34, 31; 209/717, 719, 133, 140, 141; 241/18, 19

[56] References Cited

U.S. PATENT DOCUMENTS

| | | | |
|---|---|---|---|
| 1,670,133 | 5/1928 | Bernert . | |
| 2,021,171 | 11/1935 | Buck | 406/121 |
| 2,315,079 | 2/1943 | Reeves | 406/61 |
| 2,591,411 | 4/1952 | Delsman et al. | 302/37 |
| 3,107,867 | 10/1963 | Svensson et al. | 231/102 X |
| 3,161,442 | 12/1964 | Reed | 302/49 |
| 3,326,608 | 6/1967 | Layne et al. | 406/43 |
| 3,613,920 | 10/1971 | Flamm | 214/85 X |
| 3,806,199 | 4/1974 | Aonuma | 302/49 |
| 3,866,769 | 2/1975 | Morey et al. | 214/44 A |
| 3,979,152 | 9/1976 | Morey et al. | 302/17 |
| 4,025,122 | 5/1977 | Diemert | 302/49 |
| 4,044,921 | 8/1977 | Caverly | 222/74 |
| 4,093,082 | 6/1978 | Goodsell | 214/1 X |
| 4,500,228 | 2/1985 | McDonald et al. | 406/61 |
| 4,598,875 | 7/1986 | Bronson et al. | 241/78 |
| 4,953,757 | 9/1990 | Stevens et al. | 224/310 X |
| 5,035,543 | 7/1991 | Medemblik et al. | 406/39 |
| 5,037,152 | 8/1991 | Hendricks | 296/3 |
| 5,147,156 | 9/1992 | Guettler et al. | 406/197 |
| 5,163,787 | 11/1992 | Bjorklund | 406/89 X |
| 5,353,911 | 10/1994 | Akers et al. | 198/360 |
| 5,375,721 | 12/1994 | LaVigne | 209/131 |
| 5,380,144 | 1/1995 | Smith et al. | 414/537 X |
| 5,439,152 | 8/1995 | Campbell | 224/405 |
| 5,553,762 | 9/1996 | Brown | 224/403 |
| 5,566,893 | 10/1996 | Getz | 241/27 |
| 5,649,656 | 7/1997 | Davy | 224/405 |
| 5,695,130 | 12/1997 | Csendes | 241/19 X |
| 5,718,539 | 2/1998 | Segota | 406/61 |
| 5,725,160 | 3/1998 | Harper et al. | 239/654 X |
| 5,730,577 | 3/1998 | Jones | 414/462 |
| 5,743,583 | 4/1998 | Lowe | 296/3 |
| 5,836,635 | 11/1998 | Dorman | 296/3 |
| 5,863,155 | 1/1999 | Segota | 406/61 |
| 5,868,453 | 2/1999 | Steigner | 296/100 X |

FOREIGN PATENT DOCUMENTS

| | | | |
|---|---|---|---|
| 1172671 | 8/1984 | Canada | 406/56 |
| 197708 | 9/1995 | U.S.S.R. | 406/56 |

*Primary Examiner*—Christopher P. Ellis
*Assistant Examiner*—Kenneth W Bower
*Attorney, Agent, or Firm*—R. Reams Goodloe, Jr.

[57] ABSTRACT

An apparatus for pneumatically conveying granular material such as gravel. The apparatus includes a vehicle base mounting plate, a prime mover such as a diesel engine, a hydraulically driven air blower, a hopper for receiving gravel to be conveyed, and a hydraulically driven auger assembly for moving gravel from the hopper to a pneumatic pick-up point. After pneumatic pickup, the gravel is transported through an extended network of suitable pneumatic tubing such as low friction, thick wall, PVC pipe sections, to a desired discharge location, where the material is discharged into a catch can for downward placement at a desired point. In a preferred embodiment, the auger assembly comprises a three piece unit, with a shaft, an inner auger section, and an outer auger section. The outer auger section is a replaceable wear part which can be repaired, rebuilt, or replaced as necessary due to frictional wear on the auger due to contact with the solid being conveyed. In an alternate configuration, a vertically oriented auger is provided to directly feed material to be conveyed into a pneumatic uptake tube. Preferably, the pneumatic uptake tube is manually reversable so that material can be discharged out either side of the vehicle, to enable the equipment to conveniently be deployed in narrow streets or other restricted work sites.

33 Claims, 13 Drawing Sheets

MOBILE APPARATUS FOR PNEUMATIC CONVEYANCE OF GRAVEL OR SIMILAR GRANULAR MATERIAL

FIELD OF THE INVENTION

My invention relates to mechanical systems and apparatus for use in the conveyance of granular materials such as gravel, and in particular, to mobile, truck mounted systems which are specifically adapted to pneumatically transfer gravel at remote or otherwise inaccessible site locations.

BACKGROUND

In various commercial, institutional, or residential construction projects, it is common practice to provide a gravel fill below a poured concrete foundation wall, or to provide gravel simply for ground cover in selected locations. Most commonly, sites are relatively clear, and the conveyance and spread of gravel is simply accomplished via front end loader, "Bobcat" brand type loader, or other bladed machine. However, from time to time the need arises to place gravel in locations which are not easily reached by such machines from a convenient dump or staging location where gravel may be stored. Therefore, it would be desirable to provide a means for transport of gravel from such staging area to the desired placement location.

I am aware of various attempts in which an effort has been made to provide a mobile device for pneumatic transport of granular material. Most recently, U.S. Pat. No. 5,147,156, issued Sep. 15, 1992 to Guettler et al. for GOLF COURSE CONSTRUCTION AND MAINTENANCE METHODS reveals the combination of an air compressor, conveyer belt, and a pneumatic pumping device for transporting sand or gravel through a flexible tube to a golf course being constructed or maintained. However, as taught, that device requires the transport to the staging area of a collection of components, and site assembly of the components into a working system. Earlier, U.S. Pat. No. 3,326,608, issued Jun. 20, 1967 to Layne et al. for a MOBILE GRAVELING APPARATUS AND METHOD, teaches how to assemble a trailer with a hopper and pipe necessary for gravel packing a well at a remote location. Still, the trailer does not include a compressed air supply, and the disclosed particulate entrainment device is rather primitive. Finally, U.S. Pat. No. 1,670,133, issued May 15, 1928, shows a truck mounted hopper with bottom discharge which has a gate opening over a mechanical conveyer configured for urging particulates toward an opening into a pneumatic conveying apparatus. As disclosed, the device is without sufficient detail to provide a highly reliable particulate entrainment system in gravel type applications which are of most interest to me.

Therefore, it can be seen that it would be desirable to provide a self-supporting vehicle mounted pneumatic gravel conveyance system, which combines the supply of motive air with a reliable material delivery and entrainment system.

OBJECTS, ADVANTAGES, AND NOVEL FEATURES

I have now invented, and disclose herein, a novel design for a mobile apparatus for pneumatic conveyance of gravel or similar granular material.

From the foregoing, it will be apparent to the reader that one important and primary object of the present invention resides in the provision of a novel mobile apparatus for pneumatic conveyance of gravel or similar granular material which is simpler than methods heretofore used for delivery of gravel or other particulates at remote locations.

Other important but more specific objects of the invention reside in the provision of a mobile apparatus for pneumatic conveyance of gravel or similar granular material as described herein which:

can be provided on a single mobile vehicle for simple, cost effective transport to remote job site locations;

in conjunction with the preceding object, has the advantage that it can be easily and quickly assembled, used as desired, and then quickly re-packed for return to the home shop;

which in a relatively inexpensive manner can reduce construction costs and increase flexibility of site design at unique sites where gravel transport is problematic;

which preferably delivers gravel in wear resistant, replaceable plastic pipe sections which are capable of withstanding the required pneumatic transport pressure for a desired transport distance;

has a vertically displaceable pipe rack which tilts downward at the rear to allow pipe sections to be conveniently manually gripped for ease of unloading and reloading;

has removably attachable loading ramps for convenient unloading and re-loading of a front end loader on the transport vehicle;

has a unique particulate dispersal and entrainment apparatus for reliably entraining gravel into a pneumatic line for conveyance therein;

combines the necessary equipment for pneumatic conveyance of gravel or similar granular material on a single vehicle, to avoid the necessity for separate provision of air compressors or other apparatus.

Other important objects, features, and additional advantages of my invention will become apparent to the reader from the foregoing and the appended claims and as the ensuing detailed description and discussion proceeds in conjunction with the accompanying drawing.

SUMMARY OF THE INVENTION

I have now invented and disclose herein a novel a mobile apparatus for pneumatic conveyance of gravel or similar granular, solid, or semi-solid material. The apparatus includes an over-the-road vehicle chassis having a cab and drive engine suitable for moving the vehicle to a preselected remote location and a vehicle base on which equipment is mounted. A primary hydraulic power generator is mounted on the vehicle base, as is a hopper adapted for receiving and temporarily holding a preselected charge volume of the solid or semi-solid material to be conveyed. A hydraulically driven air blower mounted on the vehicle base is adapted to intake ambient air and to provide output air under pressure, typically from between about 10 and 15 psig. A pneumatic uptake tube is provided to receive the output air under pressure from the air blower and to entrain the solid or semi-solid material to be conveyed as the solid or semi-solid material is discharged from the hopper. A hydraulically driven transfer mechanism is used for urging the solid or semi-solid material to be conveyed from the hopper to the pneumatic uptake tube. A plurality of pneumatic tube elements are provided, formed into a flexible network for carriage of the solid or semi-solid material from a proximal end sealingly connected to the pneumatic uptake tube to a distal, discharge end. At the distal or discharge end, a catch can is attached in a substantially pneumatically sealed connection to the distal or discharge end of the network of pneumatic tube elements, to catch the solid or semisolid material being conveyed and to downwardly direct the solid or semi-solid material for discharge at a desired remote location. To reduce noise, the catch can further comprises a rubber lining. Also, to increase flexibility, ideally a rubber hose element of about twenty (20) feet in length is provided connected just before the catch can. For each of the pneumatic tube elements, I prefer plastic pipe sections in PVC or ABS material, of nominal six (6) inches diameter and in schedule 40 thickness. As described herein, a network of pneumatic tube elements of up to about one thousand foot (1000') in length can be utilized for transporting solid or semi-solid materials at the rate of at least 10 cubic yards per hour, and more preferably at the rate of up to at least 20 cubic yards per hour, and most preferably, at any desired rate up to about 30 cubic yards per hour, or more. These rates can be achieved when handling solid or semi-solid materials from as low as about one-quarter inch (¼") in size up to about one inch (1") in size. For maximum speed and efficiency, I prefer to limit material size to about a seven eighths inch minus (-⅞") particle size. When using a Bobcat(tm) type front end loader, somewhere between 10 and 15 cubic yards per hour is a typical comfortable rate with a single operator handling the feed inputs.

My novel a mobile apparatus for pneumatic conveyance of gravel or similar granular material provides a simple design for quick field assembly of gravel pumping machinery. The design provides a significant improvement in the art by reducing complexity of gravel conveying systems, and by combining the various components required as suitable for compact placement on a single vehicle, so that overall project costs are significantly reduced, compared to various prior art apparatus which I have used or which is otherwise known to me.

BRIEF DESCRIPTION OF DRAWING

FIG. 9A is a partial vertical cross-sectional view, taken along 9A—9A of FIG. 9, showing the auger drive shaft and an internal labyrinth plate mounted on the shaft for preventing pluggage of the seal and bearing on the auger shaft.

DESCRIPTION

Figure 1:
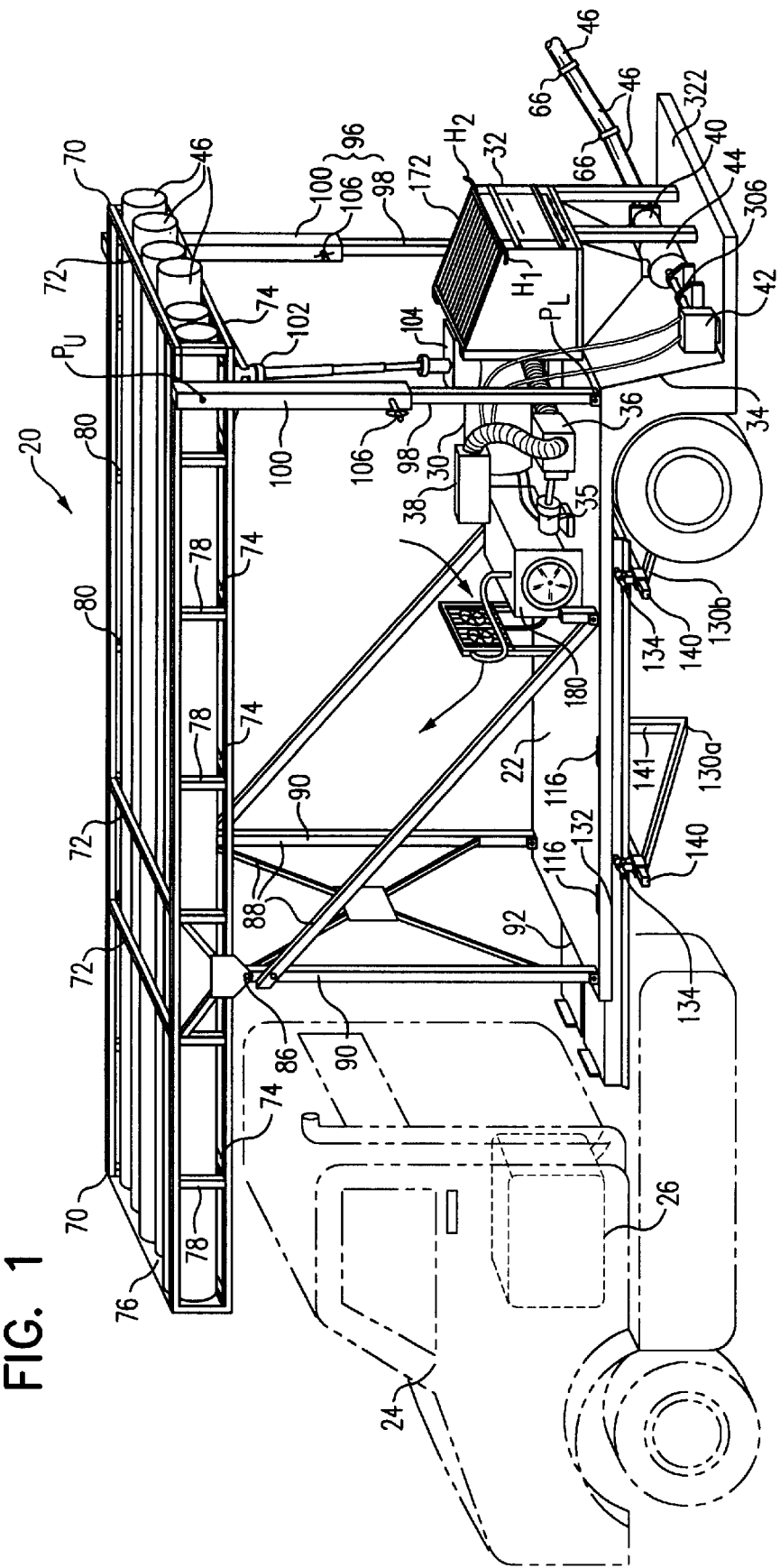
FIG. 1 is a perspective view of my mobile apparatus for pneumatic conveyance of gravel or similar granular material, showing a truck with adjustable height pipe rack, an air blower, gravel receiving hopper, and particulate entrainment apparatus.

Attention is directed to FIG. 1 of the drawing, where a perspective view of my mobile apparatus 20 for pneumatic conveyance of solid or semi-solid material (most advantageously, gravel or similar granular material) is illustrated mounted on the vehicle base 22 provided on the chassis of flat bed truck 24. Preferably, truck 24 is provided with drive engine 26 suitable for over-the-road service to any pre-selected remote location. Major components include (a) a primary engine 30 mounted on the vehicle base 22 for driving the desired hydraulic pumps, (b) a hopper 32 (preferably mounted at the rear 34 of the base 22) which is adapted for receiving and temporarily holding a preselected charge volume of the solid or semi-solid material to be conveyed, such as sand, rocks, or gravel, (c) a hydraulic drive 35 for air blower 36 which is adapted to intake a high volume of ambient air thru silencer 38 and to output that air under pressure, (d) a pneumatic uptake tube 40 which is adapted to receive the output air under pressure from the air blower 36, and to entrain the solid or semi-solid material to be conveyed as the solid or semi-solid material is discharged from the hopper 32, (e) a hydraulic pump 42 to drive a solids transfer mechanism 44 such as an auger assembly for urging the solid or semi-solid material to be conveyed from the hopper 32 to the pneumatic uptake tube 40, and (f) a plurality of pneumatic tube elements 46. The plurality of pneumatic tube elements 46 are adapted to be formed in to a flexible network 48 (see FIG. 13) for carriage of the solid or semi-solid material from a proximal 50 end that is sealingly connected to the pneumatic uptake tube 40 to a distal or discharge end 52.

Preferably, the flexible network 48 of pneumatic tube elements 46 includes, adjacent to the distal or discharge end 52 thereof, a rubber hose element 54. The rubber hose element 54 is connected to a "catch can" 56 which is manually moveable at least to some extent by virtue of the length and flexibility of rubber hose element 54, which is normally provided in at least a twenty (20) foot length. The catch can 56 is attached via a nozzle 58 in a substantially pneumatically sealed connection to the distal or discharge end 52 of the network 48 of pneumatic tube elements. Ideally, the catch can 56 allows the solid or semi-solid material 60 being conveyed to be downwardly directed in the direction of reference arrow 63 in FIG. 13, so that the solid or semi-solid material 60 is deposited at a desired remote location. Further, I have found that to somewhat reduce the noise created by operation, the catch can 56 ideally has a rubber lining 64. For most applications, the catch can 56 is provided in configuration such as is easily made from a sectioned barrel, to which support legs 62 are affixed. Legs 62 are preferably provided with pads 65 to allow the catch can to be repositioned about a surface being filled with material 60.

For pneumatic tube elements 46, I prefer to use twenty (20) foot sections of either PVC or ABS plastic pipe, nominal six (6) inch in diameter, and preferably in a schedule 40 thickness or better. Individual pneumatic tube elements 46 are joined via use of substantially leaktight flexible rubber coupling clamps 66. In this manner, a plurality of substantially rigid pneumatic tube elements 46 are flexibly joined into an air pressure containing tube wherein a mixture of solid or semi-solid matter 60 and air can be projected a sufficient velocity to carry the solid or semi-solid material 60 through the length of the network 48 so as to discharge out through the catch can 56.

I have found that by running the air blower 36 to deliver about 1000 cfm at about 10 to about 15 psig through nominal six (6) inch diameter pneumatic tube elements 46, I can achieve delivery of solids or semisolid material 60 through a network 48 of up to approximately one thousand (1000) feet in overall length. To accomplish such delivery of pressurized air, I prefer to use a Dresser/Roots brand positive displacement air blower 36 (Type PD) with an acoustic silencer 38. Generally, the blower is sized to deliver about 1200 cubic feet per minute (cfm) at about 10 pounds per square inch pressure gauge (psig), or about 1270 cfm at between 12 and 15 psig. This is substantially lower in pressure than some compressed air type systems which have been heretofore used by others, and presents fewer difficulties and dangers in implementation in the field. I have found that my system easily can deliver up to about 10 cubic yards of solid or semi-solid material 60 (such as gravel) per hour, and without difficulty can deliver up to about 20 cubic yards of solid or semi-solid material 60 per hour, and, with careful control of feed from the hopper 32 and the pressure and quantity of air supplied through the network 48, as much as 30 cubic yards per hour solid or semi-solid material may be transported to a desired location by my apparatus.

In my apparatus 20 configured as just described, it is possible to convey rock, gravel, or similar material at a size up to about one inch (1"). When the size is smaller, such as at least three quarter inch (¾"), then the material is even easier to handle. When solid or semi-solid materials are only up to about one-half inch (½") size, or are even smaller in size, such as only up to about one quarter inch (¼") in size, solid or semi-solid materials are quite easy to handle. For maximum efficiency, I prefer a nominal limitation of about a minus seven eighths inch (−⅞") particle size.

I prefer to set up my apparatus 20 in a configuration where the pressure of the output air from the air blower 36 is manually adjustable, such as by adjustment of the speed of hydraulic drive 35. Then, the pressure of outlet air from air blower 36 can be simultaneously adjusted in concert with the rate at which solid or semi-solid materials 60 are discharged from hopper 32.

Figure 2:
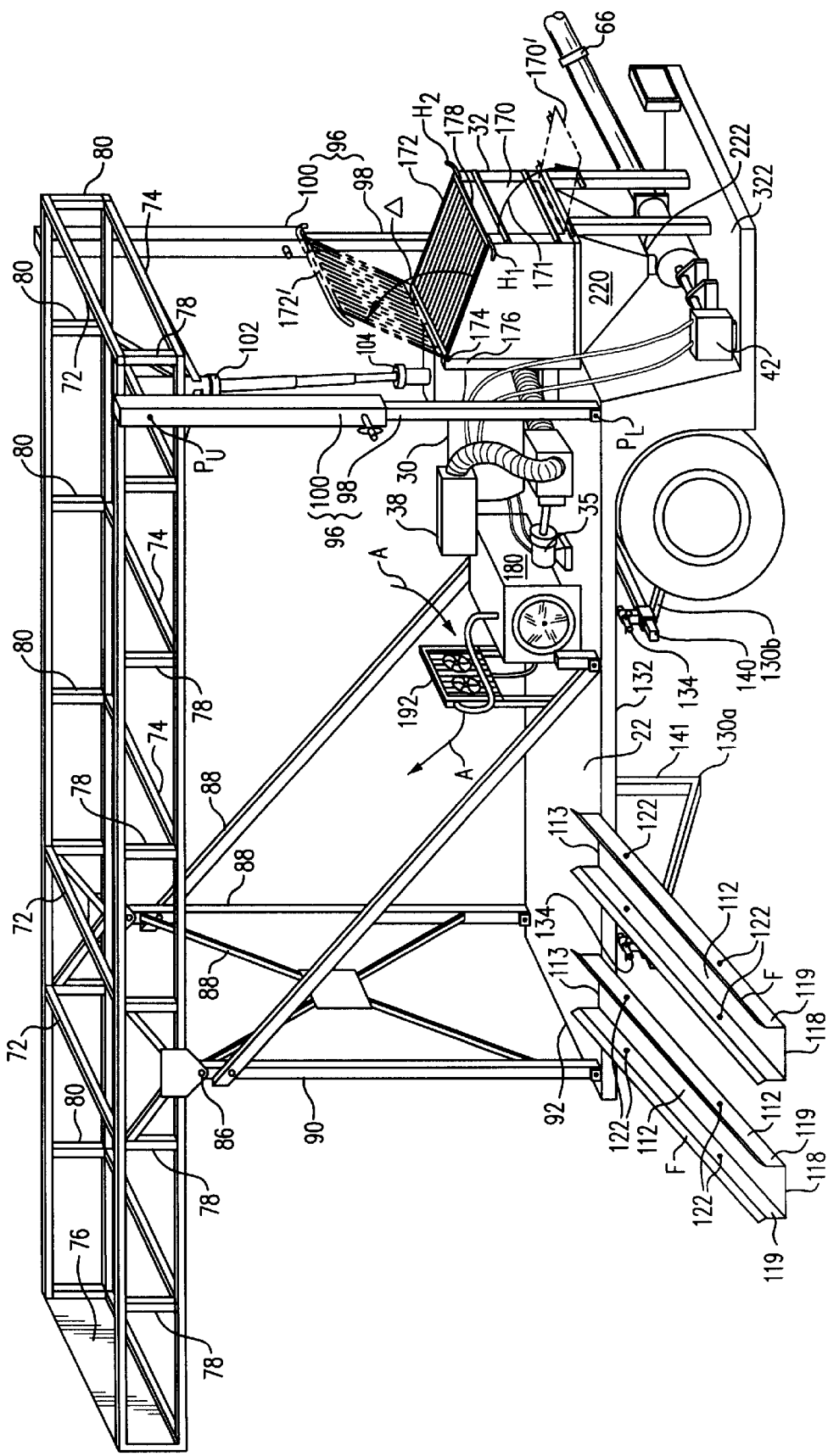
FIG. 2 is a perspective view of my mobile apparatus for pneumatic conveyance of gravel or similar granular material, now showing (i) the loading ramp for loading and unloading of a front end loader, (ii) the tiltable bar screen on the gravel loading hopper, and (iii) a front opening door on the gravel loading hopper.

As shown in FIGS. 1 and 2, apparatus 20 further comprises a pipe rack 70 mounted on the vehicle base 22. The pipe rack 70 includes a frame portion 71 which is adapted to securely receive, between an upper element 72 and a lower element 74, behind the front bulkhead 76, and between the left side frame elements 78 and the right side frame elements 80, a plurality of the pneumatic tube elements 46, for over-the-road carriage of the pneumatic tube elements 46. The frame portion 71 of rack 70 is hydraulically repositionable between an upward, pneumatic tube element 46 stowage position as depicted in FIGS. 1 and 2, and a downward, pneumatic tube element 46 element loading and unloading position as shown in FIG. 5.

Figure 4:
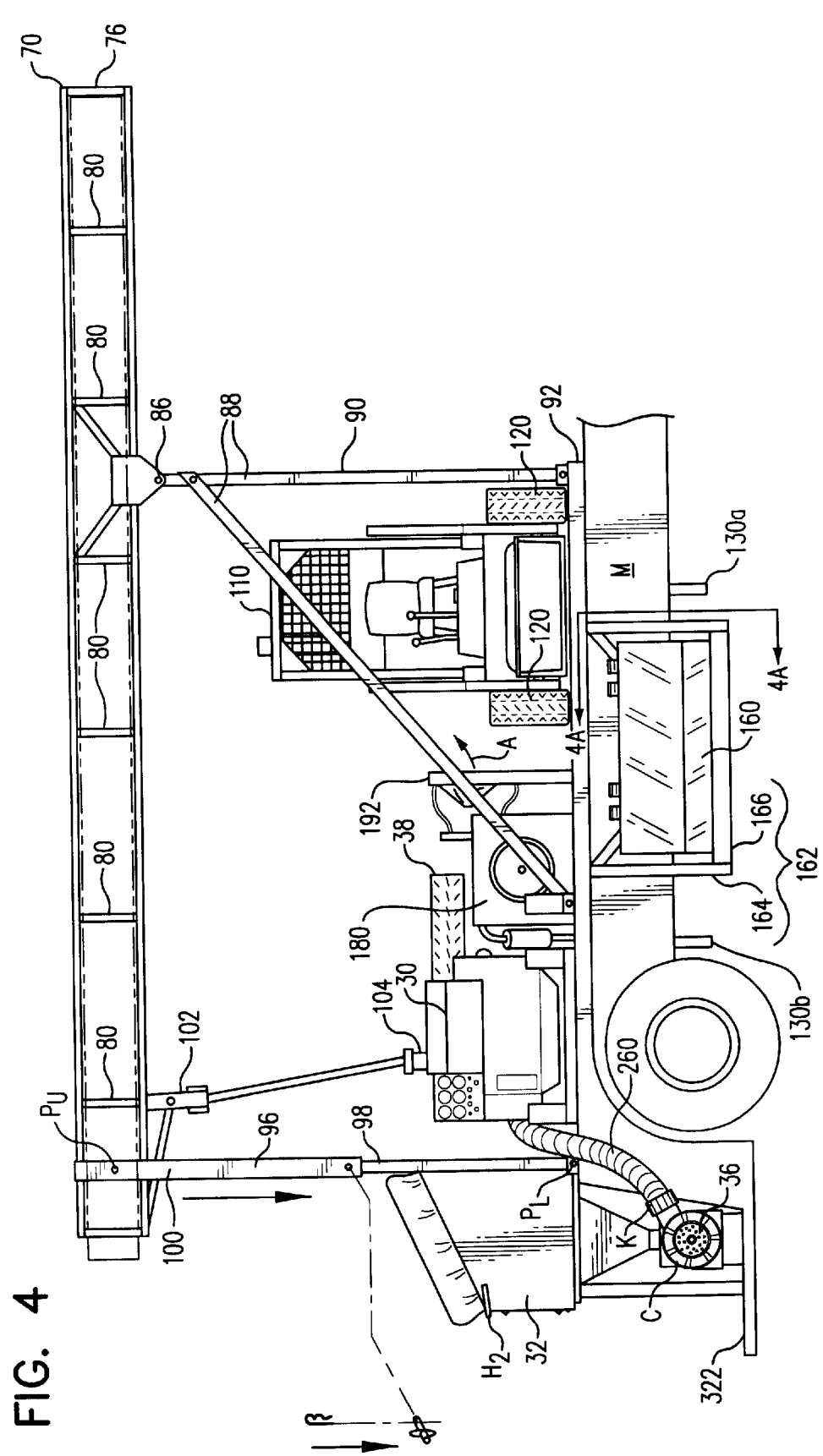
FIG. 4 is a vertical, side view of my mobile apparatus for pneumatic conveyance of gravel or similar granular material, showing the downwardly displaceable hydraulically moveable pipe rack in the normally up, or transport position.
Figure 5:
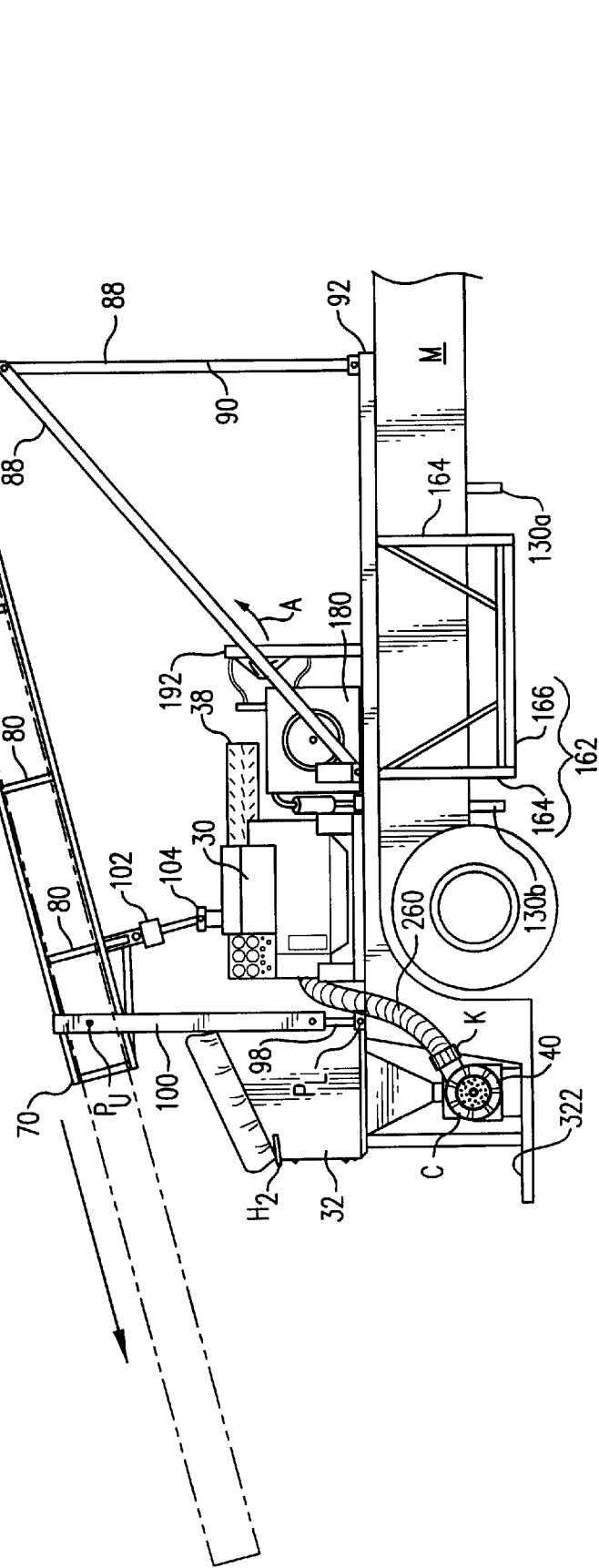
FIG. 5 is a vertical, side view of my mobile apparatus for pneumatic conveyance of gravel or similar granular material, showing the downwardly displaceable pipe rack in the downward, pipe unloading or pipe loading position.
Figure 6:
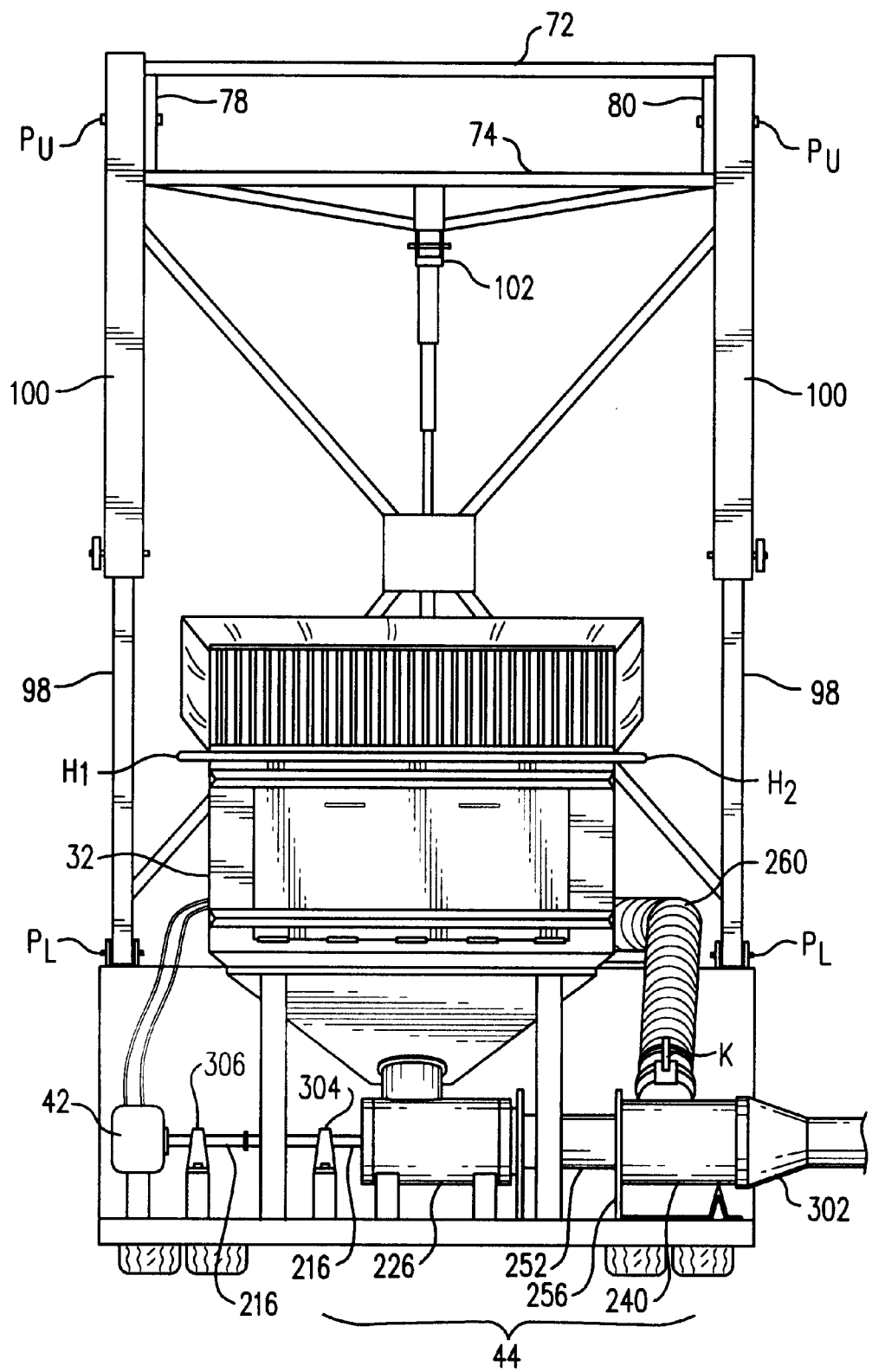
FIG. 6 is a vertical, rear view of my mobile apparatus for pneumatic conveyance of gravel or similar granular material, showing the gravel receiving hopper and the external appearance of the particulate entrainment apparatus, and showing the externally mounted hydraulic drive and bearings.

As seen by comparing FIG. 5 with FIG. 4, the frame portion 71 is pivotally connected at pivots 86 to a stationary support portion 88 which includes a first set of columns 90 which are mounted at laterally spaced apart locations along a forward area 92 of the vehicle base 22. A movable support portion of the rack 70 includes a second set of columns 96 mounted in laterally spaced apart positions along a rearward area 34 of the vehicle base 22. Each of the columns 96 of the second column pair further comprises a lower column portion 98 and a tubular upper column portion 100 which is adapted for sliding tubular engagement over the lower column portion 98, so that the rack 70 can be lowered into a downward, loading position (see in FIG. 5) by sliding the tubular upper column portions 100 downward over the lower column portions 98. This substantially vertical displacement movement is advantageously provided by a hydraulic pitching cylinder 102 which is pivotally and displaceably mounted between the frame portion 71 and a central rear area 104 near the rear portion 34 of the vehicle base 22. To secure the second columns 96 for over-the-road travel, the moveable support portion further includes a pair of locking pins 106, which are each adapted for locking engagement between the lower column portion 98 and the tubular upper column portions 100, so that the upper column portions 100 and the lower column portions 98 are securely locked together when locking pins 106 are inserted.

Further, to accommodate the slightly forward and downward arcuate motion of the rear of rack 70 when the rack is displaced from its upward, over-the-road position to its downward, unloading position, the columns 96 also have an upper pivot point PU at the upper end of each of upper column portions 100, and a lower pivot point at the lower end of each of lower column portions 98, so that the rear of rack 70 can pivot downwardly and forwardly about pivot 86 which is located at the top of the forward, stationary columns 90.

Figure 3:
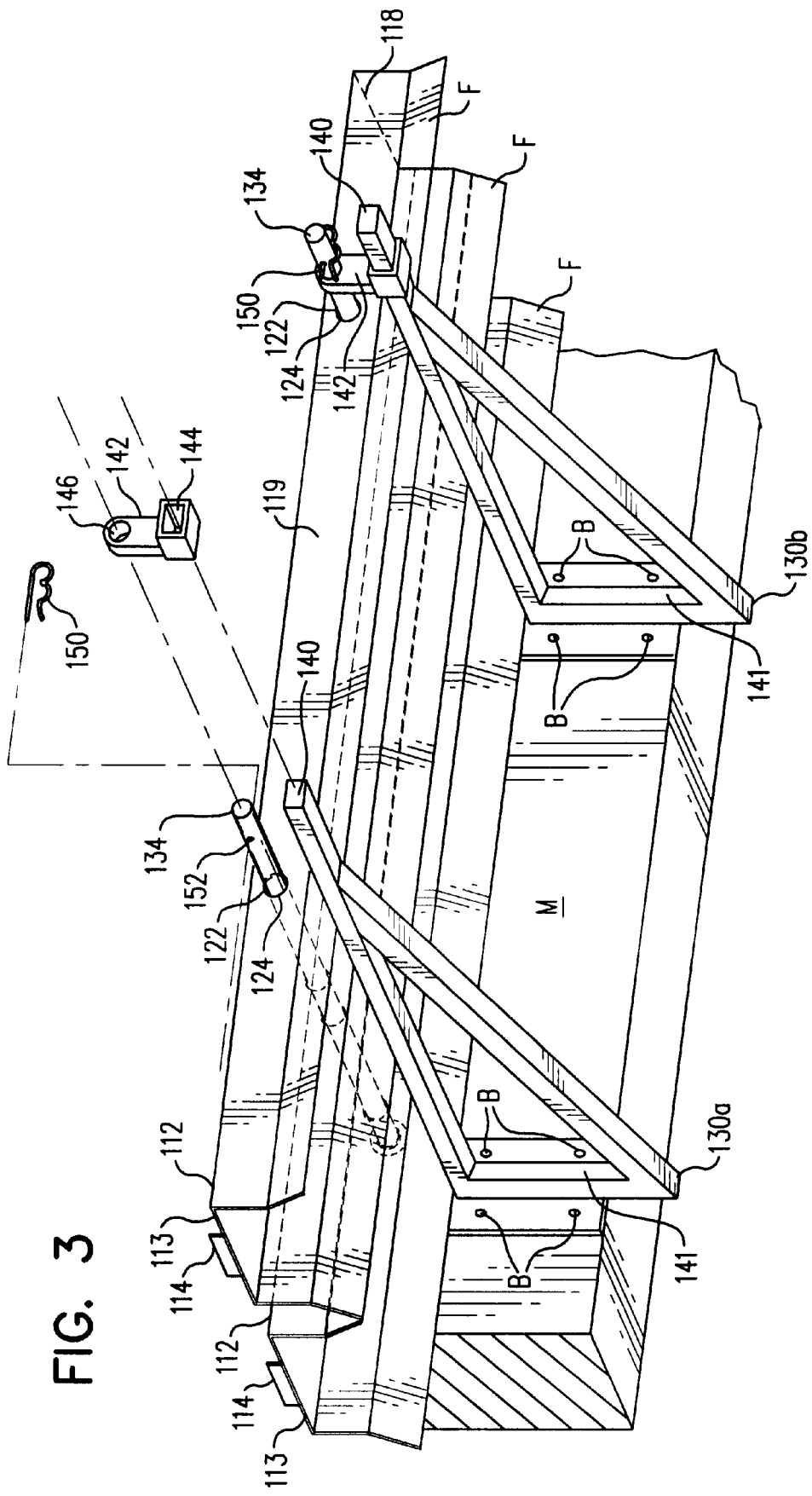
FIG. 3 is an underside perspective view of my mobile apparatus for pneumatic conveyance of gravel or similar granular material, showing removable loading ramps in their stowed position, on carriage racks below the vehicle base deck of the truck.
Figure 13:
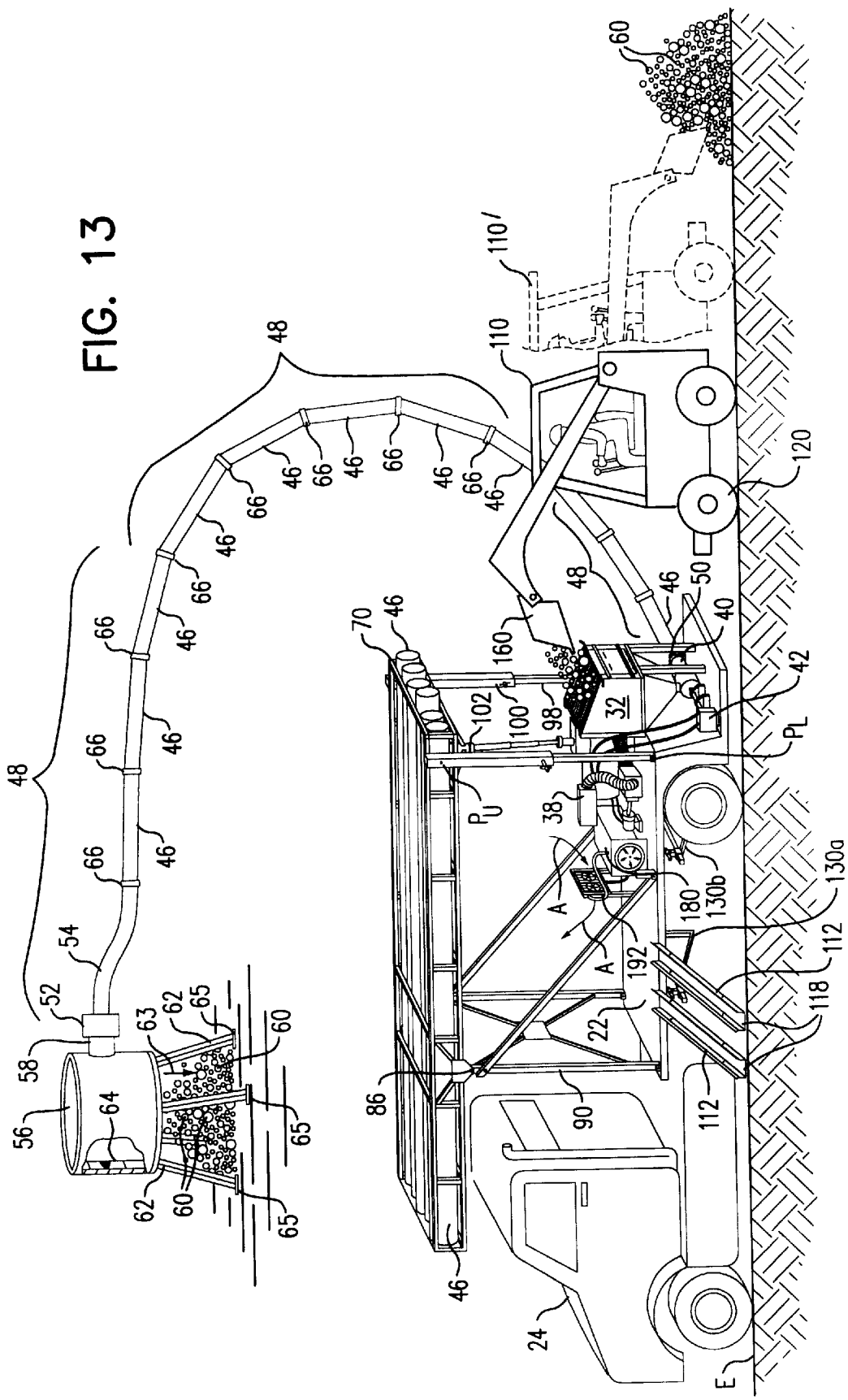
FIG. 13 is a diagrammatic illustration of my pneumatic gravel transfer apparatus shown in operation, particularly illustrating the use of a Bobcat(tm) front end loader to fill the feed hopper, and showing a lengthy piping section with gravel knockout pot at the end thereof for receiving and downwardly delivering gravel at a desired location.

As seen in FIG. 4, and as can be further appreciated with reference to FIG. 13, my apparatus 20 is adapted to carry a small Bobcat(tm) type front end loader 110 on the vehicle base 22. For loading and unloading the loader 110, a loading ramp or ramps 112 are provided, as shown in FIGS. 2, 3, and 13. Each loading ramp 112 has a first end 113 affixable to the vehicle base 22, such as by means of interfitting flanges 114 and receiving apertures 116 (see FIG. 1). A second end 118 is provided which is adapted for setting on the earth E, so that a pre-selected vehicle such as a front end loader 110 can be unloaded from the vehicle base 22 via use of one or more loading ramps 112.

Each of the loading ramps 112 has at least one raised peripheral edge portion 119 with an upwardly and outwardly angularly projecting lip flange F, to help contain on ramp 112 the wheels 120 of the loader 110. For ease in stowage and carriage of the ramps 112, each peripheral edge portion 119 of each ramp 112 further comprises a pair of laterally spaced apart apertures 122 which are defined by aperture forming portions 124 in each of the raised peripheral edge portions 119. Vehicle base 22 has a set of mounting racks 130, usually including a first rack 130($a$) and a second rack 130($b$) which are mounted at longitudinally spaced apart locations along a lower edge 132 of the vehicle base 22. Each of the mounting racks 130 have a mounting pin portion 134 which is adapted to fit through the aperture 122 defined by aperture forming portions 124 in each of the raised peripheral edge portions 119, to support and secure each of the loading ramps 112 on the mounting pin portions 134.

I prefer to build the mounting racks 130$a$ and 130$b$ each with a basic outwardly projecting triangular structural frame having an upper rectangular shaped support bar portion 140, and with a separate cylindrical shaped mounting pin portion 134 above the support bar portion 140. The structural frame 141 is preferably mounted, by fasteners B to the main chassis M of vehicle 24. Then, a locking slide bracket 142 is provided to cage the gap between mounting pin portion 134 and support bar portion 140. The slide bracket 142 is slidingly engageable with the mounting racks 130$a$ and 130$b$ via a rectangular opening portion 144 (for receiving the shaped support bar portion 140), and cylindrical opening 146 (for receiving the mounting pin portion 134). In this manner the locking slide brackets 142 are each detachably mountable to their respective mounting rack 130$a$ or 130$b$. To secure the locking slide brackets 142, a locking pin 150 is provided for insertable locking engagement with a locking pin receiving portion 152 in each of the the cylindrical shaped mounting pin portions 134. When the loading ramps 112 are loaded and thusly secured, they are ready for over-the-road transport.

Figure 4A:
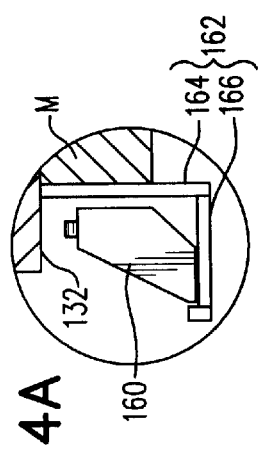
FIG. 4A is a partial cross-sectional view, taken across section 4A—4A of FIG. 4, showing the bucket rack below the vehicle base, carrying a detachable bucket from a front end loader.

Looking at FIGS. 4, 4A, and 5, it can also be seen that the front end loader 110 is shown loaded without the bucket 160. To completely utilize the space available in non-oversize over-the-road truck beds, I have found it advantageous to detach bucket 160 and place it in bucket rack 162 which is affixed on the underside 132 of vehicle base 22. In FIG. 4, I have depicted a right-side bucket rack 162 which has a downward extending hangers 164 that are attached to main chassis M, and a bottom support 166 attached to hangers 164. The bucket 160 rests on bottom support 166 for transport, as more clearly seen in the side view provided in FIG. 4A.

Returning to FIG. 2, the hopper 32 is shown with a front door 170 that opens forwardly and downwardly as indicated by reference arrow 171; the open position 170' is shown in broken lines. When open, the front door advantageously provides immediate chute access to the hopper 32, as may be desired by a cement truck or a gravel chute from appropriately equipped transport units. In that manner, the necessity to use loader 110 for filling hopper 32, as shown in FIG. 13 (between a pile of material 60 in broken lines as loader 110', and at the hopper dumping the gravel as loader 110) for example, is avoided. Also shown in FIG. 2 is the upwardly pivoting bar screen 172, which pivots upwardly by an angle delta ($\Delta$) about a pair of pivots 174 located at the upper rear 176 of hopper 32, to an upper position shown in broken lines as 172'. Hand grabs $H_1$ and $H_2$ are provided at either side of the front 178 of bar screen 172, so that the bar screen 172 may be manually lifted when desired.

Figure 8:
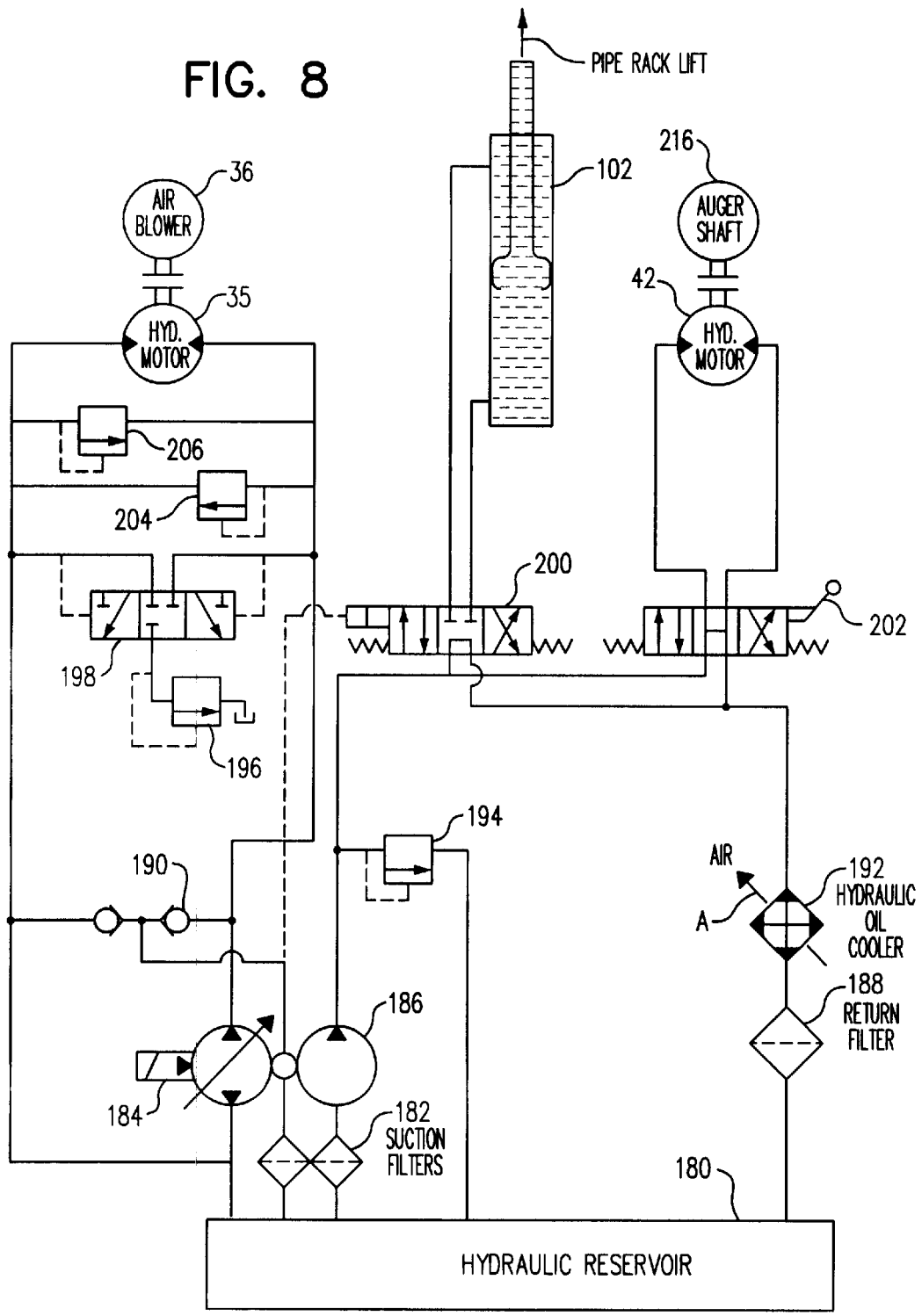
FIG. 8 is a schematic of the hydraulic system used in my mobile apparatus for pneumatic conveyance of gravel, showing how the hydraulically powered blower and screw auger are used for providing powering the transport of gravel in the system.

Turning now to FIG. 8, the operation of my hydraulically driven gravel pumping apparatus can be readily understood by those of skill in the art and for whom this specification is written, by review of one exemplary hydraulic operational scheme. Hydraulic oil is stored in reservoir 180. Oil is drawn thru suction filters 182 by the air blower pump 184, and by the open loop auger/rack lift pump 186. Makeup check valves 190 prevent backflow. Return hydraulic oil is cooled by air A passing through the hydraulic oil cooler 192, and the cooled oil is filtered by return filters 188 before being replaced in the hydraulic reservoir 180. Overpressure in the rack pump loop is prevented by pressure relief valve 194, and overpressure in the air blower pump loop is prevented by charge pressure relief valve 196. Control in the air blower pump loop is maintained by the hot oil shuttle spool 198, and crossport relief valves 204 and 206 are provided. Hydraulic pressure and oil flow in the air blower pump loop runs hydraulic blower motor 35 to turn the air blower 36, such as a Dresser/Roots brand positive displacement air blower as earlier described.

Similarly, hydraulic pressure and oil flow in the auger pump loop drive the auger motor 42, for running the auger shaft 216 of a desired auger configuration and at a desired speed. For most applications, I have found the horizontal auger assembly 44 needs to be adjustable, preferably manually, from about 700 to about 2200 rpm, and more commonly from about 700 to about 1800 rpm. The speed of the auger motor 42 is preferably controlled by manual actuator lever 202. The pipe rack 71 lift cylinder 102 is electrically controlled by the rack cylinder actuator 200.

Figure 7:
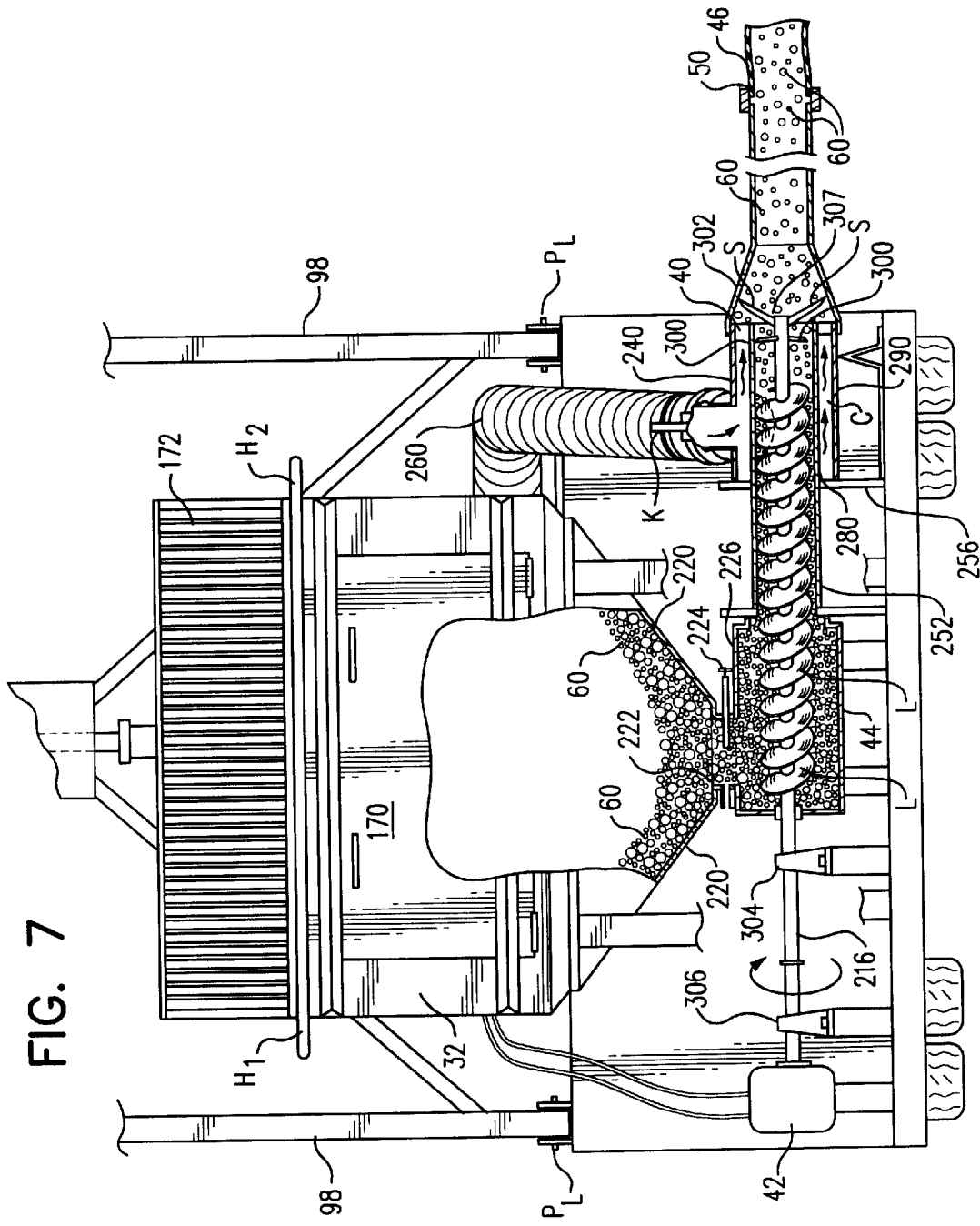
FIG. 7 is another rear view of my mobile apparatus for pneumatic conveyance of gravel or similar granular material, showing the hydraulically drive auger screw conveyor and particulate entrainment apparatus.

Control of my apparatus 20 is fundamentally based on three variables, namely the rate of feed of material 60 from hopper 32, the rotation rate of the auger shaft 216, and the output air pressure provided from blower 36. Typically, I prefer to use a manual control for material 60 leaving the hopper, normally by slide valve 224 as indicated in FIG. 7. The auger shaft 216 speed is typically manually controlled at actuator lever 202, as just mentioned, and the pressure of the outlet air is determined by balancing the speed of blower 36 against the pressure drop encountered in any particular network of pneumatic tubing elements.

For a primary power supply to drive the various hydraulic equipment, I have found it advantageous to employ a Deutz brand diesel engine 30, fuel injected and air cooled with turbocharger. The actual horsepower required will vary according to the service and thru-put, however, a Deutz diesel of about 94 horsepower will be sufficient for many service conditions of interest to me.

Figure 9:
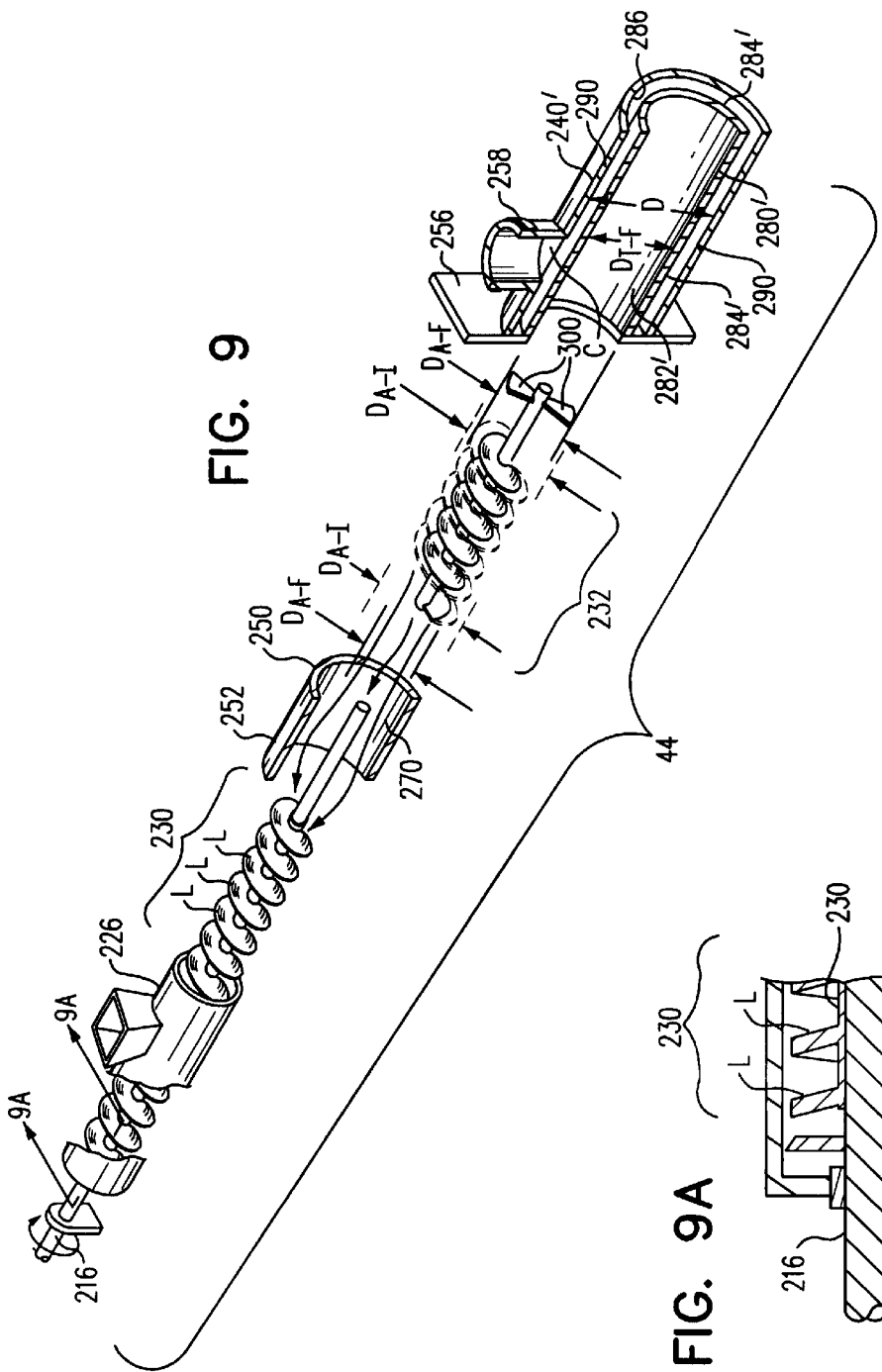
FIG. 9 is a perspective view of the auger assembly used in the present invention, showing how the outer section, when worn to a smaller diameter, can be enclosed by a smaller diameter adapter assembly tube for longer overall service life.

Turning now to FIGS. 7, 9, and 9A, further details of one desirable auger configuration is depicted. The hopper 32 is mounted on the vehicle base 22. The hopper has downwardly sloping lower sidewalls 220 which end at a hopper bottom outlet 222. The hopper 32 is adapted for receiving and temporarily holding a charge volume of the solid or semi-solid material 60 to be conveyed. Material 60 is discharged out through a the bottom outlet 222, which is preferably manually regulated such as by manual slide valve 224, which allows material to dump into inlet box 226 below.

Figure 10:
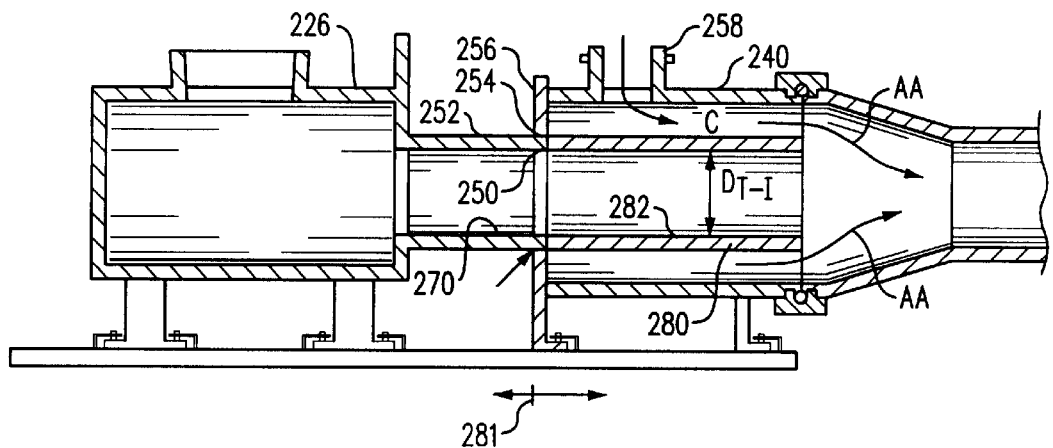
FIG. 10 is a vertical cross section of the pneumatic uptake tube for feeding solid or semi-solid material, without auger.
Figure 11:
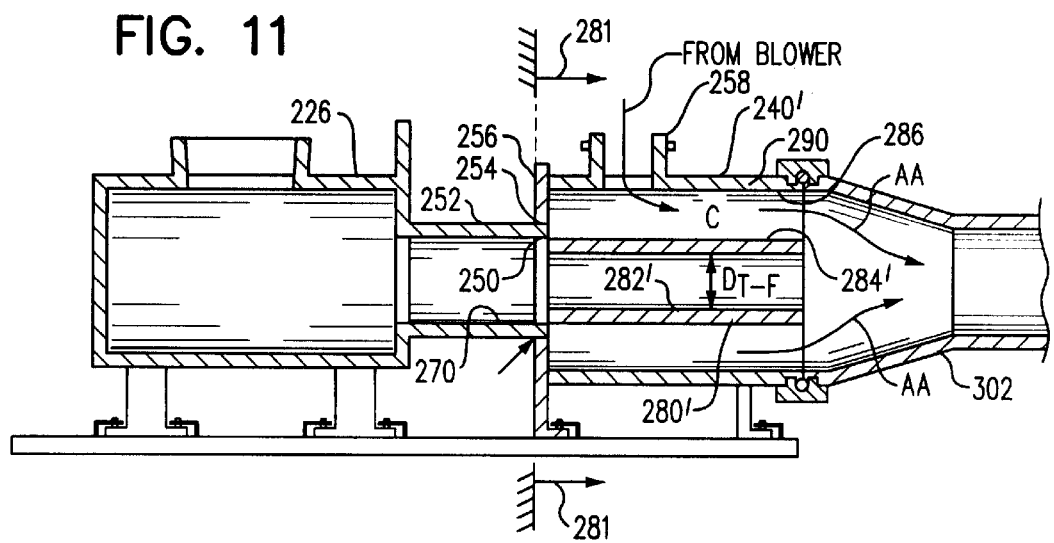
FIG. 11 is a vertical cross-sectional view of the pneumatic uptake tube for feeding solid or semi-solid material, similar to FIG. 10, but now showing a smaller diameter adapter assembly with a smaller diameter second tubular section for use with a worn outer auger section.

The inlet box 226 of auger assembly 44 allows uptake of material 60 by the auger flytes L. As shown in FIGS. 7 and 9, a "three-piece" auger assembly 44 is provided, where shaft 216 has slidably mounted thereon in close fitting fashion an inner auger section 230, and an outer auger section 232. Since the outer auger section 232 has a substantially greater wear pattern, and thus shorter working life, it is advantageous to split the auger function into inner 230 and outer 232 sections. In this way, an adapter section 240 can be provided in an initial inner tubular diameter $D_{T-I}$ for initial service, and a final inner tubular diameter $D_{T-F}$ for later service, where the final inner tubular diameter is less than the initial inner tubular diameter, as seen in FIG. 9, or by comparison of FIGS. 10 and 11. Thus, it can be seen that the diameter of flytes L of the outer auger section 232 are of diameter $D_{A-I}$ at the start (shown in broken lines in FIG. 9), and of diameter $D_{A-F}$ at when the second adapter section 240' is utilized. Generally, I prefer to use about a five and three quarter inch (5¾") diameter $(D_{A-I})$ sized new auger. Thus, it can be appreciated that the flytes of the outer auger section 232 decrease in diameter as the apparatus 20 pumps gravel. While wear rates vary widely depending upon the material being pumped, I have found that up to about 700 cubic yards of gravel may be pumped initially, and by changing to the second, smaller size adapter section 240', up to about 400 additional cubic yards of gravel may be pumped before it is necessary to retrofit the auger assembly 44 with a fresh outer auger section 232.

The adapter assembly 240 is preferably detachably joined to the distal, outlet end 250 of first tubular member 252 of the inlet box 226. This can be easily accomplished providing a recess receiving area 254 at inlet plate 256 of the adapter assembly 240 or 240', so that the outlet end 250 is in abutting relationship with the inlet plate 256. A quick connect type detachable pneumatic coupling K is preferably provided to join the inlet 258 of the adapter assembly 240 with the flexible hose 260 which supplies the output air from the air blower 36.

The first tubular member 252 has an inner wall 270 which is adapted to confine the solid or semi-solid material 60 therein as the auger flytes L of the auger assembly 44 urges the material 60 along the shaft 216 in the axial direction of the auger assembly 44, as determined by the angular shape of the auger flytes L.

A second tubular member 280 is provided, preferably co-linear and along the same axis as the first tubular member 252, and starting effectively at the the outlet end 250 thereof. More precisely, the second tubular member 280 is structurally affixed to, and starts at the inlet plate 256 of the adapter assembly 240 or 240'. However, the inlet to the second tubular member 280 or 280' is positioned to receive the output from the first tubular member 252, as both are axially centered about the shaft 216 to extend confine material 60 therein as the auger flytes L of the auger assembly 44 urge the material 60 along. Importantly, the adapter assembly 240 or 240' is joined to the first tubular member 252 of the inlet box 226, but is manually detachable along match line detach point as indicated by reference arrow 281.

The second tubular member 280 or 280' has an inner wall 282 or 282' which confines the material 60 being conveyed. To receive output air from the air blower 36, an annular air receiving chamber C is formed between the outer wall 284 or 284' of second tubular member 280 or 280' and the inner wall 286 of shell member 290 of adapter 240 or 240'. The annular air receiving chamber C provides a receiving space for output air so that the pressurized air can be redirected co-axially with the solid material 60. Thus, air ejected from the chamber C is directed substantially linearly outward along the axis of the second tubular member 280 or 280', where it can impact and accelerate material 60 which is flung outward into the airstream AA by one or more, and preferably two beater ears 300, shown as attached to the outer auger section 232. This can be further seen by comparing FIGS. 7 and 9, for example, where beater ears 300 are shown spinning to deflect material 60 such as rock or gravel substantially radially outward toward the annular airstream AA. Once into the airstream AA, the particles of material 60 are in the pneumatic uptake tube and are accelerated in the acceleration zone which extends through the reducer section 302 which, by reducing the cross-sectional area, increases the flow velocity of air stream AA. Consequently, the material 60 is accelerated and then carried through the pneumatic tubing sections 46. I prefer to use victaulic brand couplings between the adapter assembly 240 or 240' and the reducer section 302, or at further locations near the reducer 302 where necessary. However, further outward, flexible rubber joints 66 are used between pneumatic tube portions 46.

Drive shaft 216 of the auger assembly 44 is preferably provided, in so far as is possible, with external bearings, such as pillow block bearings 304 and 306 behind inlet box 226 of the auger assembly 44. However, as shown in FIG. 7, an internal bearing 307 is sometimes desirable at the distal end of shaft 216. Bearing 307 is mounted from the interior of reducer section 302, typically by three support arms S.

Also, as noted in FIG. 9A, I normally include a disc shaped internal labyrinth plate P detachably mounted on the shaft 216 for preventing pluggage of the seal 298 (and/or bearing, if desired) on the auger shaft 216. Preferably, an outwardly directed slinging surface 299 helps separate solids and prevent material 60 from migrating toward the seal 298.

Figure 12:
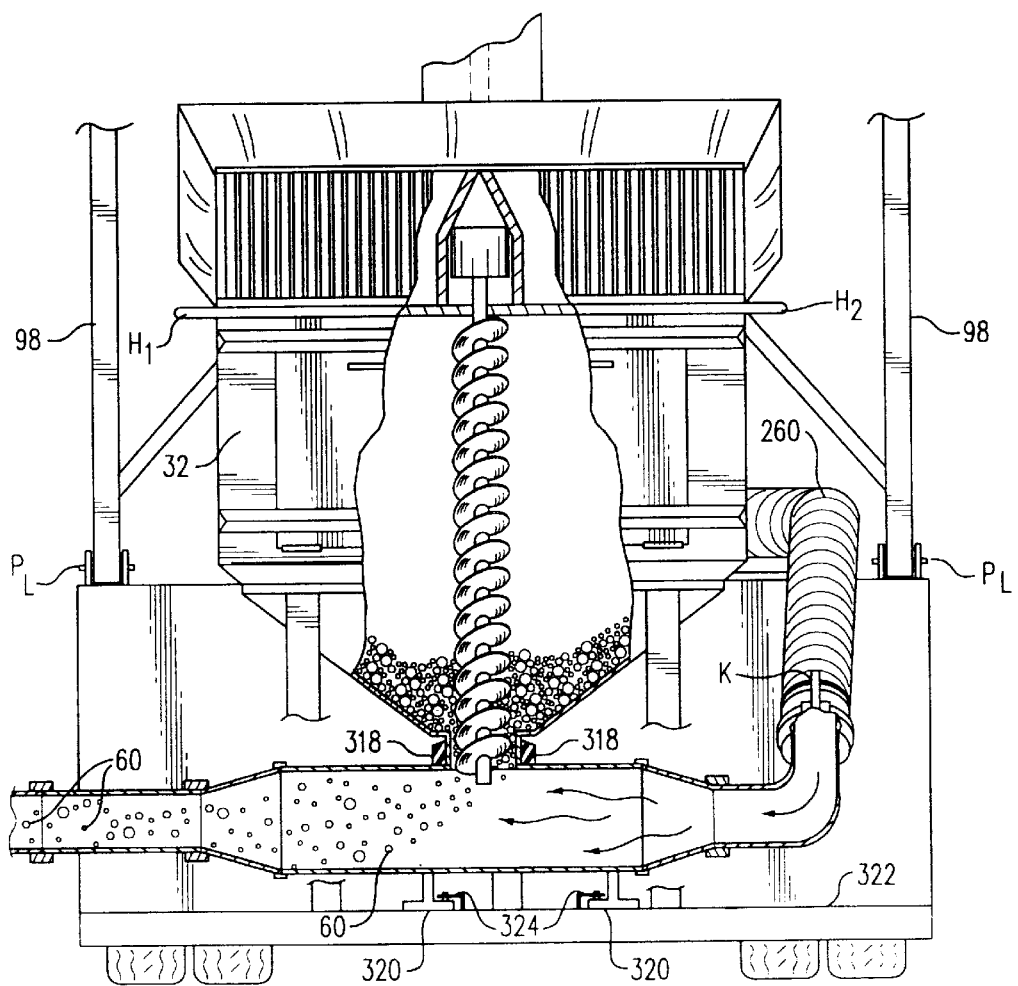
FIG. 12 is a vertical, partially broken away view of the gravel hopper, showing a second embodiment of my gravel feed mechanism, now using a vertically oriented auger with short delivery tube to an air entrainment tube, and a rubber entrainment collar over the joint therebetween; the manually reversible air entrainment tube is shown in a left hand discharge configuration, with quick connect air supply connection to the inlet end.
Figure 14:
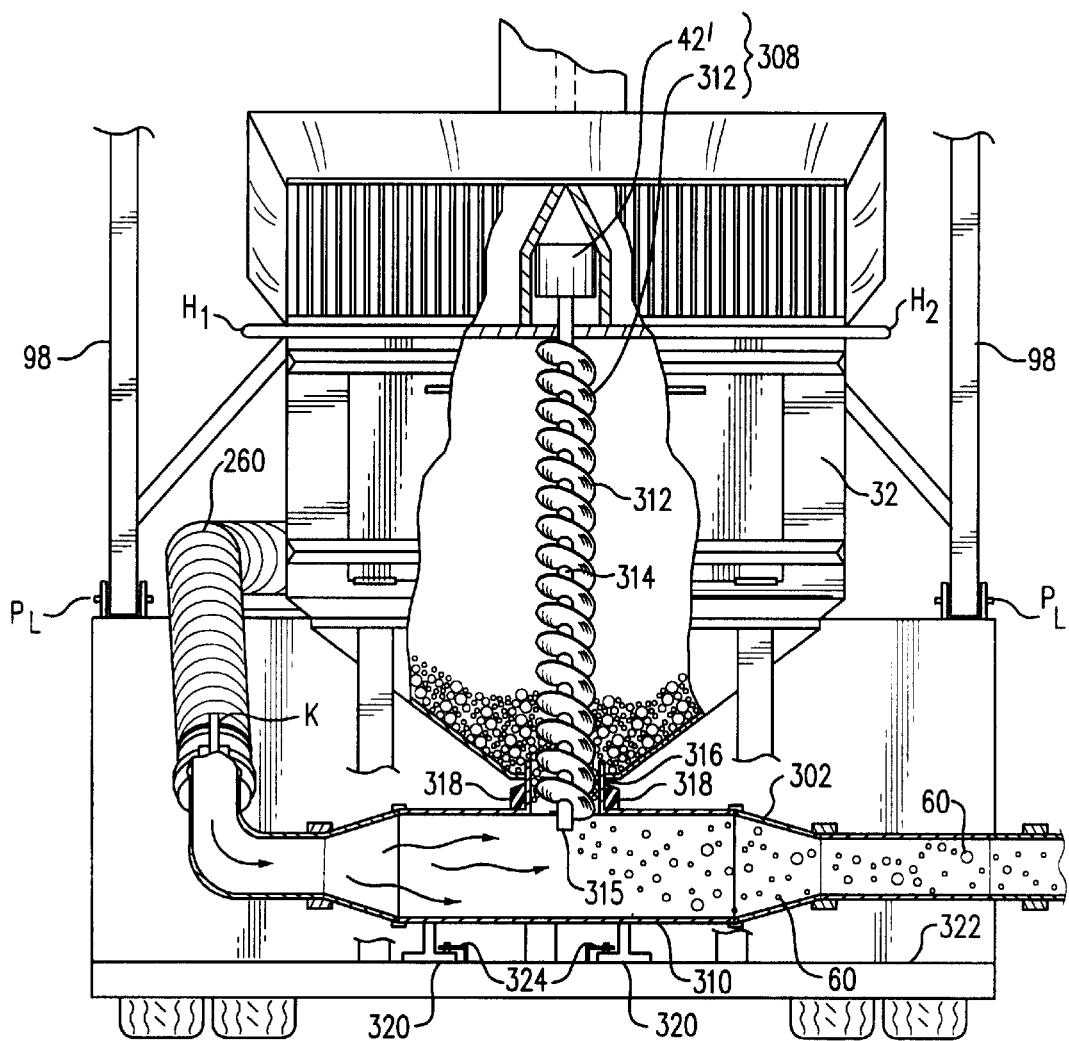
FIG. 14 is vertical, partially broken away view of the gravel hopper, similar to the view first shown in FIG. 12 above, but now showing the second embodiment of my gravel feed mechanism, using the reversible air entrainment tube in a right hand discharge configuration.

In an alternate embodiment shown in FIGS. 12 and 14, a hydraulically driven transfer mechanism 308 is provided for urging the solid or semi-solid material 60 to be conveyed from the hopper 32 into a pneumatic uptake tube 310. The transfer mechanism 308 preferably comprises a hydraulical drive (42') and adjustable speed auger 312 which is rotatably mounted in the hopper in a substantially vertical axial orientation. In this manner, the auger 312 has a downwardly extending shaft portion 314 with a lower end 315 that extends through the bottom 316 of the hopper 32 and into the pneumatic uptake tube 310. Thus, the auger 312 urges the discharge of solid or semi-solid material 60 downwardly and outwardly from the hopper 32 and into the pneumatic uptake tube 310. The joint between the pneumatic uptake tube 310 and the hopper 32 is effectively sealed by using a rubber collar 318, to prevent escape of pressurized air.

Another important feature of my invention is depicted in FIGS. 12 and 14, namely, the reversible direction of pneumatic solids uptake tube 310. As shown in FIG. 12, the uptake tube 310 tube 310 is mounted in a detachable, manually reversible left hand discharge configuration, so that the discharge pneumatic tube sections 46 are emerging from the left hand side of the truck 24. Preferably, quick connect air supply fittings K are used to connect output air supply hose 260 with the pneumatic uptake tube 310. In FIG. 14, the vertical, partially broken away view of the gravel hopper 32 is similar to the view first shown in FIG. 12, but the pneumatic uptake tube 310 is now shown in a right hand discharge configuration, where the pneumatic tube sections 46 are discharged from the right hand side of the truck 24. In this way, unique job-site limitations can be easily and quickly accommodated, particularly those which involve the necessity to avoid blocking narrow street or service road locations. To assure quick manual reversibility, the uptake tube 310 weight is minimized, and the tube 310 is mounted on reversible feet 320 that are detachably affixable to truck base 322 with releasable mounts 324.

It is to be appreciated that the mobile apparatus for pneumatic conveyance of gravel or similar granular material provided by the present invention is a significant improvement in the state of the art of pneumatic conveyance equipment, especially for providing compact vehicle mounted equipment that is easily assembled and disassembled at remote jobsites. Although only a few exemplary embodiments of this invention have been described in detail, it will be readily apparent to those skilled in the art that the my mobile apparatus for pneumatic conveyance of gravel or similar granular material may be modified from those embodiments provided without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein, and not only structural equivalents thereof, but also equivalent structures. Thus, the scope of the invention, as indicated by the appended claims rather than by the foregoing description, is intended to include variations from the embodiments provided which are nevertheless described by the broad meaning and range properly afforded to the language of the claims, or to the equivalents thereof.

I claim:

1. A mobile apparatus for pneumatically conveying solid or semi-solid material, said apparatus comprising:
   (a) a vehicle base, said vehicle base comprising an over-the-road vehicle chassis with cab and drive engine suitable for moving said vehicle to a pre-selected remote location;
   (b) a primary hydraulic power generator mounted on said vehicle base;
   (c) a hopper mounted on said vehicle base, said hopper having downwardly sloping lower sidewalls ending a a hopper bottom, said hopper adapted for receiving and temporarily holding a charge volume of said solid or semi-solid material to be conveyed before discharge out through sid hopper bottom;
   (d) a hydraulically driven air blower mounted on said vehicle base, said air blower adapted to intake ambient air and to output air under pressure;
   (e) a pneumatic uptake tube, said pneumatic uptake tube adapted to receive said output air under pressure from said air blower and entraining said solid or semi-solid material to be conveyed as said solid or semi-solid material is discharged from said hopper;
   (f) a hydraulically driven transfer mechanism for urging said solid or semi-solid material to be conveyed from said hopper to said pneumatic uptake tube, said transfer mechanism further comprising a hydraulically driven adjustable speed auger rotatably mounted in said hopper on a substantially vertically oriented axially extending shaft having a lower end, said lower end of said shaft extending substantially to said hopper bottom to enable said auger, upon rotation, to urge the discharge of said solid or semi-solid materials downwardly and outwardly therefrom.

2. A mobile apparatus for pneumatically conveying solid or semi-solid material, said apparatus comprising:
   (a) a vehicle base, said vehicle base comprising an over-the-road vehicle chassis with cab and drive engine suitable for moving said vehicle to a pre-selected remote location;
   (b) a primary hydraulic power generator mounted on said vehicle base;
   (c) a hopper mounted on said vehicle base, said hopper adapted for receiving and temporarily holding a charge volume of said solid or semi-solid material to be conveyed;
   (d) a hydraulically driven air blower mounted on said vehicle base, said air blower adapted to intake ambient air and to output air under pressure;
   (e) a pneumatic uptake tube, said pneumatic uptake tube adapted to receive said output air under pressure from said air blower and entraining said solid or semi-solid material to be conveyed as said solid or semi-solid material is discharged from said hopper;
   (f) a hydraulically driven transfer mechanism for urging said solid or semi-solid material to be conveyed from said hopper to said pneumatic uptake tube;
   (g) a plurality of pneumatic tube elements, said plurality of pneumatic tube elements adapted to be formed in to a flexible network of pneumatic tube elements adapted for carriage of said solid or semi-solid material from a proximal end sealingly connected to said pneumatic uptake tube to a distal, discharge end; and
   (h) a rack mounted on said vehicle base, said rack adapted to secure receive said pneumatic tube elements for over-the-road carriage of said plurality of pneumatic tube elements.

3. The apparatus as set forth in claim 2, wherein said network of pneumatic tube elements comprises a pneumatic tube of up to one thousand foot (1000') in length.

4. The apparatus as set forth in claim 2, wherein said apparatus has a capacity to convey at least 10 cubic yards per hour of solid or semi-solid material.

5. The apparatus as set forth in claim 2, wherein said apparatus has the ability to convey rock up to one inch (1") size.

6. The apparatus as set forth in claim 2, wherein said apparatus has the ability to convey rock up to at least minus seven/eighths inch ($-\frac{7}{8}$") size.

7. The apparatus as set forth in claim 2, further comprising a catch can, said catch can attached in a substantially pneumatically sealed connection to said distal, discharge end of said network of pneumatic tube elements, said catch can adapted to catch said solid or semi-solid material being conveyed and to downwardly direct said solid or semi-solid material for discharge at a desired remote location.

8. The apparatus as set forth in claim 7, wherein said catch can further comprises a rubber lining.

9. The apparatus as set forth in claim 2, wherein said plurality of pneumatic elements forming said network of pneumatic tube elements comprises, adjacent to the distal, discharge end thereof, a rubber hose element.

10. The apparatus as set forth in claim 9, wherein said rubber hose element is approximately twenty (20) feet in length.

11. The apparatus as set forth in claim 2, wherein said pneumatic tube elements comprise substantially rigid plastic pipe sections.

12. The apparatus as set forth in claim 11, wherein said rigid plastic pipe sections are six (6) inches in diameter.

13. The apparatus as set forth in claim 11, wherein said rigid plastic pipe sections comprise schedule 40 pipe of material selected from the group comprising PVC and ABS.

14. The apparatus as set forth in claim 2, wherein said apparatus has a capacity to convey up to at least 20 cubic yards per hour of solid or semi-solid material.

15. The apparatus as set forth in claim 14, wherein said apparatus has a capacity to convey up to at least 30 cubic yards per hour of solid or semisolid material.

16. A mobile apparatus for pneumatically conveying solid or semi-solid material, said apparatus comprising:
  (a) a vehicle base, said vehicle base comprising an over-the-road vehicle chassis with cab and drive engine suitable for moving said vehicle to a pre-selected remote location;
  (b) a primary hydraulic power generator mounted on said vehicle base;
  (c) a hopper mounted on said vehicle base, said hopper having downwardly sloping lower sidewalls ending a a hopper bottom, said hopper adapted for receiving and temporarily holding a charge volume of said solid or semi-solid material to be conveyed before discharge out through said hopper bottom;
  (d) a hydraulically driven air blower mounted on said vehicle base, said air blower adapted to intake ambient air and to output air under pressure;
  (e) a manually pneumatic uptake tube, said detachable pneumatic uptake tube adapted to receive said output air under pressure from said air blower and entraining said solid or semi-solid material to be conveyed as said solid or semi-solid material is discharged from said hopper;
  (f) a hydraulically driven transfer mechanism for urging said solid or semi-solid material to be conveyed from said hopper to said pneumatic uptake tube, said transfer mechanism further comprising an auger assembly mounted below said hopper in a substantially horizontal orientation, said auger assembly having an axially extending rotatable shaft with an adjustable speed hydraulic drive affixed thereto, said shaft extending substantially from below said hopper bottom to said pneumatic uptake tube, to enable said auger assembly, upon shaft rotation, to urge the discharge of said solid or semi-solid materials into said detachable pneumatic uptake tube, wherein said auger assembly further comprises
    (1) a first tubular member, said first tubular member having a discharge end, said first tubular member having an inner wall adapted to confine said solid or semi-solid material therein as said auger assembly urges said material along in said auger assembly's axial direction;
    (2) a second tubular member, said second tubular member having (A) an inlet end abutting said discharge end of said first tubular member, (B) an axially extending inner wall adapted to confine said solid or semi-solid material therein as said auger assembly urges said material along in said auger assembly's axial direction, and (B) an axially extending outer wall; and
  (g) wherein said manually detachable pneumatic uptake tube further comprises a shell member, said shell member and said second tubular member of said auger assembly forming an annular air receiving chamber therebetween for receiving said output air from said air blower and redirecting said output air linearly to form a material acceleration zone in said pneumatic uptake tube.

17. The apparatus as set forth in claim 16, wherein said auger assembly further comprises an inner auger section and an outer auger section, and wherein said inner and said outer auger sections are each detachably affixed to said shaft in an orientation to said axially extending shaft so that upon rotation of said shaft, said each of said inner and said outer sections urge said solid or semi-solid material along to said pneumatic uptake tube.

18. The apparatus as set forth in claim 17, wherein said auger assembly further comprises, at the distal end of said outer auger section, one or more beater ears, said beater ears configured to impinge said solid or semi-solid material and then fling said material outward into said material acceleration zone in said pneumatic uptake tube.

19. The apparatus as set forth in claim 18, wherein said pneumatic uptake tube further comprises a reducing chamber section, said section adapted to decrease the interior area through which said output air must travel, thus increasing the velocity thereof.

20. The apparatus as set forth in claim 16, further comprising a manually adjustable pressure of said output air from said air blower.

21. The apparatus as set forth in claim 20, wherein said pressure of said output air is controlled to between about 10 and about 15 psig.

22. The apparatus as set forth in claim 21, wherein the speed of said auger assembly and the pressure of said output air are simultaneously controllable.

23. The apparatus as set forth in claim 16, further comprising a pipe rack mounted on said vehicle base, said rack adapted to secure receive said pneumatic tube elements for over-the-road carriage of said plurality of pneumatic tube elements.

24. The apparatus as set forth in claim 23, wherein said pipe rack comprises a support portion and a frame portion pivotally attached to said support portion, said frame portion having a rear portion which is hydraulically repositionable between an upward, piping element stowage position, and a downward, piping element loading and unloading position.

25. The apparatus as set forth in claim 24, wherein said support portion of said pipe rack comprises first column pair mounted in laterally spaced apart locations along a forward area of said vehicle base, and wherein each of said columns of said first column pair is pivotally mounted to said frame portion.

26. The apparatus as set forth in claim 25, wherein said support portion of said pipe rack further comprises a second column pair mounted in laterally spaced apart positions along a rearward area of said vehicle base, and wherein each of said columns of said second column pair further comprises a lower column portion and a tubular upper column portion adapted for sliding tubular engagement over said lower column portion, so that said frame can be lowered into a downward, loading position by sliding said tubular upper column portions downward over said lower column portions.

27. The apparatus as set forth in claim 26, wherein said pipe rack further comprises a pair of locking pins, said pair of locking pins adapted for locking engagement between each of said lower column portions and said upper column portions, so that said upper column portions and said lower column portions may be locked during over-the-road transport.

28. The apparatus as set forth in claim 16, further comprising a loading ramp, said loading ramp comprising a first end affixable to said vehicle base portion, and a second end adapted for setting on earth, so that a pre-selected vehicle such as a front end loader can be unloaded via said ramp from said vehicle base portion.

29. The apparatus as set forth in claim 28, wherein said ramp comprises a first ramp portion and a second ramp portion, and wherein each of said first and second ramp portions further comprise a pair of raised peripheral edge portions.

30. The apparatus as set forth in claim 29, wherein each of said first and said second ramp portions further comprise a pair of laterally spaced apart apertures defined by aperture forming portions in each of said raised peripheral edge portions.

31. The apparatus as set forth in claim 30, wherein said vehicle base further comprises a set of mounting racks said mounting racks having a first rack and a second rack affixed at longitudinally spaced apart locations along a lower edge of the vehicle base, said mounting racks having a mounting pin portion adapted to fit through said aperture forming portions in each of said raised peripheral edge portions, to support and secure each of said loading racks thereon.

32. The apparatus as set forth in claim 31, wherein said mounting racks further comprise a rectangular shaped support portion and a cylindrical shaped mounting pin portion, and wherein a locking slide bracket is provided with a rectangular opening portion for receiving said support portion, and a cylindrical opening for receiving said mounting pin portion, so that said locking slide bracketed is detachably mountable to said mounting racks.

33. The apparatus as set forth in claim 32, further comprising a locking pin, and wherein said mounting pin portion further comprises a locking pin receiving portion, so that said locking pin can be inserted in said locking pin receiving portion after said racks are loaded, so as to secure said racks for transport.

* * * * *